Oct. 7, 1969　　　W. L. RASMUSSEN　　　3,470,747
ACCELEROMETER APPARATUS
Filed Aug. 1, 1966　　　　　　　　　　　　　　　2 Sheets-Sheet 1

INVENTOR.
WILLIAM L. RASMUSSEN
BY Bruce C Lutz
ATTORNEY

INVENTOR.
WILLIAM L. RASMUSSEN
BY
ATTORNEY

United States Patent Office  3,470,747
Patented Oct. 7, 1969

3,470,747
ACCELEROMETER APPARATUS
William L. Rasmussen, Minneapolis, Minn., assignor to Honeywell Inc., Minneapolis, Minn., a corporation of Delaware
Filed Aug. 1, 1966, Ser. No. 569,261
Int. Cl. G01p 15/08
U.S. Cl. 73—517    2 Claims

ABSTRACT OF THE DISCLOSURE

Two voltage controlled variable frequency oscillators are used in a rebalance circuit. Both oscillators provide a variable frequency output and a variable voltage output. The outputs of one oscillator are directly related, and the outputs of the other oscillator are inversely related to the magnitude of the output signal of a sensing device. The variable frequency signals are applied to the input of a digital subtractor and the variable voltage signals are applied to a differential amplifier. The output of the amplifier is used for rebalance purposes.

Background of the invention

Feedback rebalance loops are in common use associated with accelerometers. A simple accelerometer rebalance loop would comprise an accelerometer and an amplifier. The acceleration output of the accelerometer connects to the input of the amplifier and the output of the amplifier provides the rebalance signal to the accelerometer. An acceleration signal may be derived from the rebalance current. This type of rebalance loop usually only provides a DC indication of acceleration. If a digital expression of acceleration is needed, a conversion step is necessary. This conversion step will introduce additional errors which are not compensated by the feedback loop since this step is not within the feedback loop. Another type of commonly used rebalance loop comprises an accelerometer, several amplifiers, a DC motor, and a tachometer. The signal generated by the accelerometer is amplified and used to control the speed of the DC motor. The tachometer yields a signal proportional to motor speed, and thus proportional to the signal input to the motor. The signal from the tachometer is further amplified and used to supply the rebalance signal necessary. This type of loop is better because a digital type signal may be derived from the moving shaft of the motor and the motor is within the feedback to substantially correct any error in the voltage to shaft speed transformation. This type of loop has a definite disadvantage because of its use of electromechanical devices and their associated weight, size, and inherent unreliability.

The present invention solves the above problems by using an electronic means which is within the feedback loop to generate the informational output and the rebalance signal.

Description of the invention

It is an object of this invention to provide a new and novel rebalance loop which has an accurate informational output and a rebalance output.

Further objects and advantages will become apparent from a reading of the specification and claims in conjunction with the drawings wherein:

Figure 1:
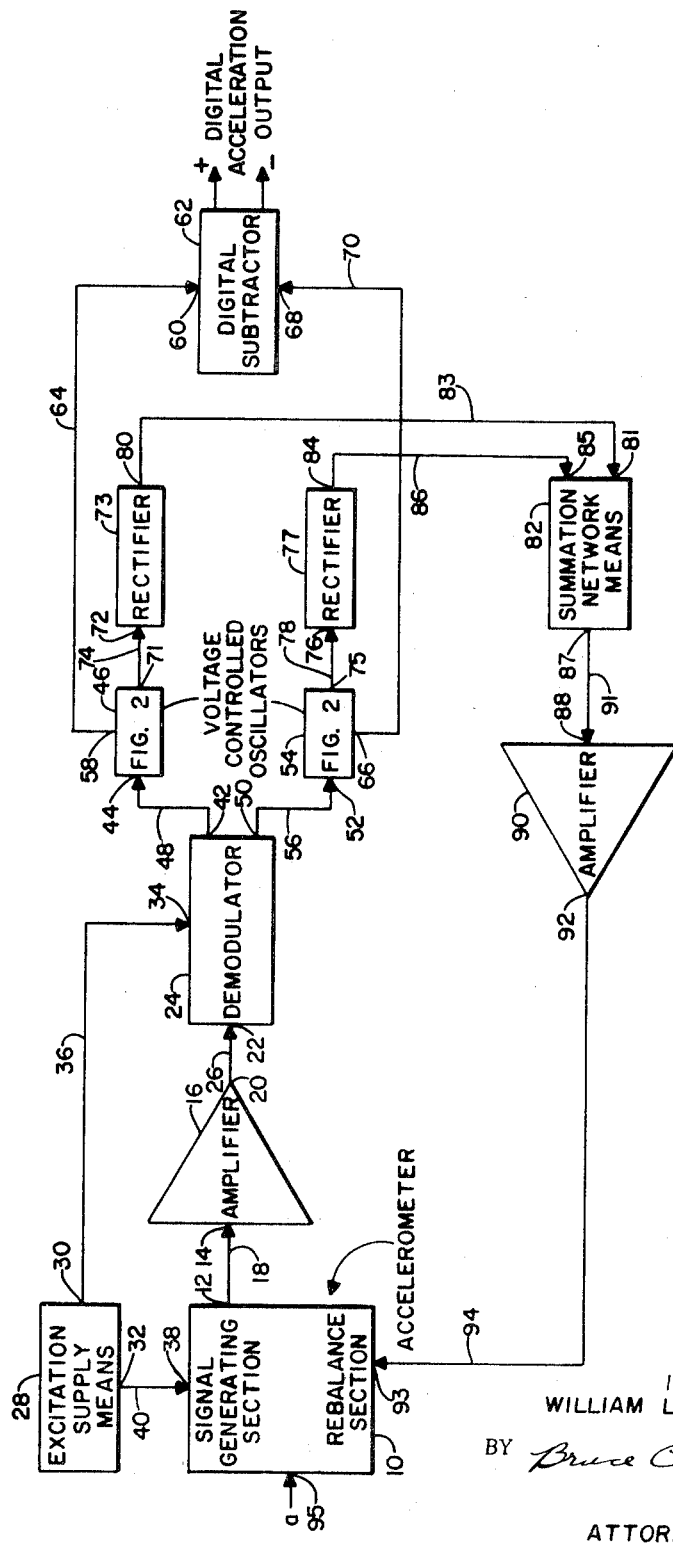
FIGURE 1 is a preferred embodiment showing the new rebalance loop as used in conjunction with an accelerometer.

In FIGURE 1 a force rebalance accelerometer means or acceleration indicating means 10 having an output means 12 is connected to an input means 14 of a high gain amplifier or differential amplifying means 16 by a connection 18. An output means 20 of amplifier 16 is connected to an input means 22 of a phase sensitive demodulating means or demodulator 24 by a connection 26. An AC excitation supply means 28 has output means 30 and 32 connected to an input means 34 of demodulator 24 through a connection 36 and to an input means 38 of accelerometer 10 through a connection 40 respectively. An output means 42 of demodulator 24 is connected to an input means 44 of a voltage controlled oscillator means or voltage controlled, square loop core, astable magnetic multivibrator 46 through a connection 48. Another output means 50 of demodulator 24 is connected to an input means 52 of another voltage controlled oscillator means or voltage controlled, square loop core, astable, magnetic multivibrator 54 through a connection 56. A first output means 58 of oscillator means 46 is connected to an input means 60 of a digital subtractor means 62 by a connection 64. A first output means 66 of oscillator means 54 is connected to another input means 68 of digital subtractor means 62 through a connection 70. A second output means 71 of oscillator means 46 is connected to an input means 72 of rectifier or rectifying means 73 by a connection 74. A second output means 75 of oscillator means 54 is connected to an input means 76 of another rectifier rectifying means 77 by a connection 78. An output means 80 of rectifier 73 is connected to an input means 81 of a summation network means, amplifier means or differential amplifying means 82 by a connection 83. An output means 84 of rectifying means 77 is connected to another input means 85 of summation network means 82 through a connection 86. An output means 87 of summation network means 82 is connected to an input means 88 of an amplifier or differential amplifying means 90 by a connection 91. An output means 92 of amplifier 90 is connected to a second input means 93 of accelerometer 10 through a connection 94. Accelerometer means 10 also has a first input means 95 which is sensitive to an acceleration.

Figure 2:
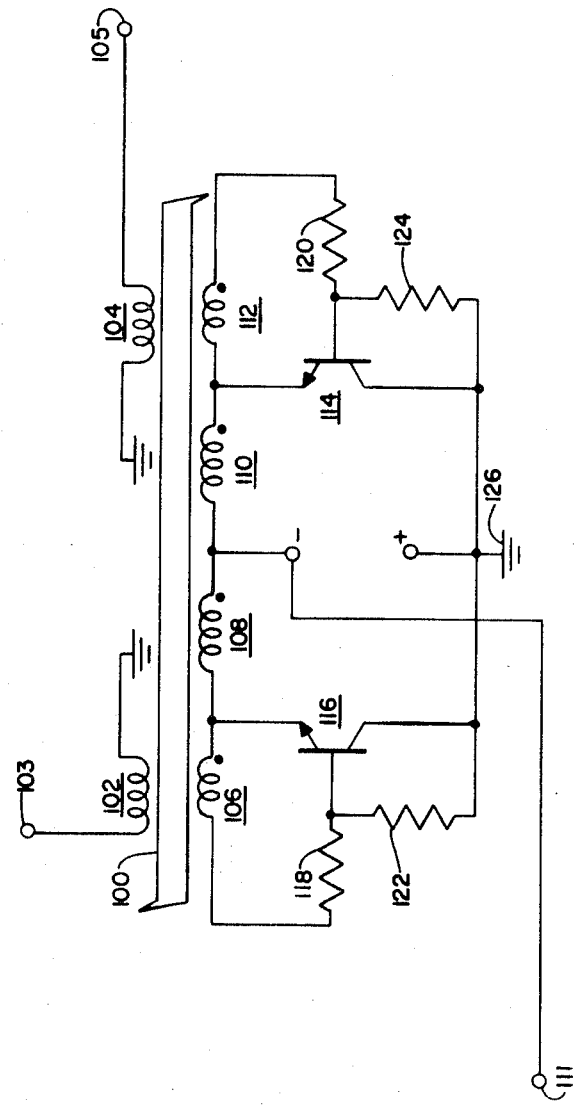
FIGURE 2 is a preferred embodiment of voltage controlled oscillator blocks 46 and 54 shown within FIGURE 1.

In FIGURE 2, square loop core magnetic means 100 is shown with: a secondary winding 102 providing first output means 103 such as output means 58 shown in FIGURE 1; a secondary winding 104 providing second output means 105 such as output means 71 shown in FIGURE 1; and primary windings 106, 108, 110, and 112. If standard dot nomenclature is used to designate the first end or start of a winding, the first end of primary winding 108 and the second end of primary winding 110 are connected to an input means 111 and to a negative power source. The other ends of windings 108 and 110 are connected to the first end of primary 106, an emitter of an NPN transistor 116, and to the second end of primary 112, an emitter of an NPN transistor 114 respectively. The other ends of windings 106 and 112 are connected to a resistor 118 and a resistor 120 respectively. The other ends of resistors 118 and 120 are connected to resistor 122, a base of transistor 116 and to resistor 124, a base of transistor 114 respectively. The other end of resistors 122 and 124 are connected to the collectors of transistors 116 and 114 and to ground or reference potential 126. The previously unconnected ends of secondary windings 102 and 104 and the collector of transistor 116 are connected to ground 126.

Operation of the invention

With reference to FIGURE 1, a signal indicative of or proportional to an acceleration sensed by accelerometer 10 is used to control voltage controlled oscillators 46 and 54. Oscillators 46 and 54 provide informational outputs 58 and 66 (which are subtracted to yield a digital acceleration output) and rebalance outputs 71 and 75 (which are rectified and combined in summation network means 82 and applied to the rebalance section of accelerometer 10 to rebalance it).

More particularly an excitation supply 28 provides a signal to accelerometer 10 which is modified by accelerometer 10 in accordance with the acceleration occurring. Accelerometer 10 provides this signal to amplifier 16 and then to demodulator 24. Demodulator 24 is a phase sensitive demodulator, as is indicated by the additional input from the excitation supply. Outputs 42 and 50 from demodulator 24 indicate its phase sensitive nature by reversing their relative polarity in response to a change in polarity in the input acceleration. If, for example, output 42 increases in amplitude and ouput 50 decreases in amplitude for an increasing acceleration input, then for a deceleration input this would reverse and output 42 would decrease in magnitude and output 50 would increase in magnitude. The differential outputs of demodulator 24 control the voltage controlled oscillators 46 and 54 in a manner explained with reference to FIGURE 2. The net result is: the oscillating frequency of one oscillator increases and the oscillating frequency of the other oscillator decreases in the presence of an increasing acceleration and the reverse process occurs in the presence of deceleration. If there is no acceleration input, both oscillators have the same frequency, i.e., whatever frequency they are biased to in a quiescent state. This frequency information is derived from first output means 58 of oscillator 46 and first output means 66 of oscillator 54. The signals from first output means 66 and 58 are digitally subtracted in digital subtractor 62. Digital subtractor 62 acts to convert double ended information to single ended information, i.e. information with respect to ground, not information with respect to other information. Digital subtractor 62 provides a pulse train whose repetition frequency is indicative of the acceleration found. Velocity information is derived from this pulse train by integrating the acceleration information or in this case counting the pulses per unit time, which is the digital equivalent of integration. Second outputs 71 and 75 from oscillators 46 and 54 are rectified and filtered such that the information occurring on connections 83 and 86 comprises DC voltages which are indicative of or proportional to the repetition frequencies of their respective voltage controlled oscillators, in the preferred embodiments. Why this results is explained with reference to FIGURE 2. These voltages, appearing on connections 83 and 86, are summed in summation network means 82 in order again to convert from double ended information to single ended information, i.e., information which has a value with respect to ground instead of information which has a value with respect to other information outputs. The output of summation network 82 is amplified in amplifier 90 and comprises the rebalance signal necessary to rebalance accelerometer 10. As is well known to those in the art, the rebalance technique comprises inserting a feedback or rebalance signal which effectively counteracts any acceleration input sensed by accelerometer 10. This means that the output provided by output means 12 of accelerometer 10 becomes substantially zero. This signal never exactly reaches zero except when there is no acceleration present because a small error signal is necessary to provide an input to amplifier 16. If amplifier 16 has sufficient gain a signal will still appear on connection 26 which may be demodulated and used to control the voltage controlled oscillators. Thus accelerometer 10 has in effect two inputs; one provided by an existing acceleration, and one provided by the rebalance signal from the feedback loop. The fact that accelerometer 10 is continually operated about a null allows a much wider operating range than is possible if accelerometer 10 merely provides an output signal on output means 12 which is proportional to or indicative of an acceleration sensed. Thus, accelerometer 10 provides an output signal which is amplified; the amplified signal is used to provide an informational output and a rebalance signal; the rebalance signal is amplified and applied again to accelerometer 10 to complete the feedback loop. By placing the informational output within the feedback loop, much more accurate information may be obtained since the feedback of the loop tends to correct for any errors within itself. In the embodiment shown, an analog acceleration output may also be generated by providing an output which is proportional to or indicative of the rebalance current necessary. FIGURE 1 shows an accelerometer which provides an AC signal output. As is seen from the demodulation necessary, this is not necessary. An accelerometer which provides a DC output would eliminate the need for excitation supply 28 and demodulator 24. Additionally, an AC rebalance signal for the accelerometer may be easily generated by this type of feedback loop since the analog rebalance signal may be converted from a digital type signal.

One of the points of novelty of the present invention is the use of an electronic embodiment of voltage controlled oscillators 46 and 54 instead of an electromechanical embodiment. The electronic embodiment used comprises one or more active devices and provides an informational output and a rebalance output which is proportional to or indicative of the informational output. As used above, an electronic means is to be differentiated from electromechanical means such as a motor tachometer combination; the term active device is used in its usual connotation in the art of the device with power gain as opposed to, for instance, a motor which has a power loss from input to output; the words proportional to and indicative of are used interchangeably and have the usual meaning of related to by some function, not necessarily directly related to.

With reference to FIGURE 2, a voltage applied to input means 111 causes transistor 114 or transistor 116, whichever is faster, to assume a saturated condition because of the base currrent provided by either the bias resistors 118 and 112 associated with transistor 116 or bias resistors 120 and 124 associated with transistor 114. Assuming transistor 116 assumes a saturated condition before transistor 114, a voltage nearly equal to the supply voltage, is impressed across primary winding 108. The voltage impressed across primary winding 108 induces a voltage in primary winding 106 in a direction to maintain transistor 116 in a saturated condition, and in primary winding 112 in a direction which prevents transistor 114 from assuming a saturated condition. This condition remains until square loop core 100 saturates. Because of its square loop characteristics, the transistion from a nonsaturated to a fully saturated state at the knee of the hysteresis curve is achieved very rapidly. When saturation is reached, the voltage across all windings falls toward zero since it is related to the rate of change of flux in square loop core 100 and there is only a very small rate of change of flux in square loop core 100 when it is in a saturated condition. Since the voltage across primary winding 106 falls towards zero, the base current into transistor 116 falls toward zero. This allows transistor 116 to begin assuming a nonconducting state. As transistor 116 assumes a nonconducting state, the current through the primary winding 108 begins to decrease. As the current in primary winding 108 begins to decrease, the magnetic field induced by this current begins to collapse. It is well known to those skilled in the art that a collapsing magnetic field will induce a voltage which tends to oppose a further reduction of the magnetic field. In this case, this voltage is opposite to the voltage which appeared across all the windings when transistor 116 was in a saturated condition. This means that the voltage induced in primary winding 112 tends to cause transistor 114 to enter a saturated state and the voltage induced in primary winding 106 tends to cause transistor 116 to enter a nonconducting state. This positive feedback action reverses the process first assumed where transistor 116 was in a saturated state and transistor 114 was in a nonconducting state. It will be recognized by those skilled in the art that the symmetry of the circuit allows this process to repeat continually. Transistors 114 and 116 will be alternately in conducting and nonconducting states, i.e. the circuit oscillates at a frequency determined by the saturation time of the square loop core. Saturation time of the square loop core is dependent on how fast the saturation level of flux is reached. Since the rate of change of flux in square loop core 100 is directly related to the voltage impressed through input means 111, the higher the voltage impressed through input means 111 the faster the square loop core 100 will saturate. This means that a faster repetition frequency is achieved for an increase in voltage applied through input means 111 up to a voltage determined by other circuit considerations such as transistor breakdown.

The multivibrator shown in FIGURE 2 also has the characteristic that it will provide an output which may be rectified and filtered to yield a signal which varies directly with multivibractor oscillation frequency. This may be explained in two ways: (1) Since before the square loop core material saturates the core acts as a transformer, one would expect the DC value of the output voltage to approximate that of the supply voltage or input voltage. (2) Since the frequency of the magnetic oscillator is dependent on the supply voltage and the net flux change in the square loop core from saturation in one direction to saturation in the other direction is constant, one would expect that for a higher supply voltage a higher oscillation frequency would be obtained, this higher frequency would cause the next rate of change of flux to increase, this increase in rate of change of flux would cause an increase in the induced voltage on the output. Therefore, this type of multivibrator provides an output proportional to its oscillation frequency which is used to form the rebalance signal in the preferred embodiment.

A more complete design procedure may be obtained from a booklet entitled "Design Manual Featuring Tape Wound Cores" as published by Magnetics, Inc. of Butler, Pa., and designated TWC–300 with a copyright date 1962.

Although this invention has been explained thus far in conjunction with an accelerometer, it will be realized by those skilled in the art that this type of rebalance loop may be used with many other types of devices. This rebalance loop is not limited to accelerometers. Devices such as gyros and rebalance temperature sensing indicators or any rebalance device may be used with this rebalance loop. Also, various types of amplifiers such as differential amplifiers or single-ended amplifiers and amplifiers of various gains depending on the application may be used in this feedback loop. It will also be realized by those skilled in the art that amplifiers shown in FIGURE 1 may or may not be needed depending on the particular rebalance device used and the embodiment of block 28 desired. Any embodiment of blocks 46 and 54 which electronically provide an informational output proportional to an input and a rebalance output proportional to the informational output may be used. Also, a differential arrangement has been shown but is not necessary to practice this invention. It will be realized by those skilled in the art that power supplies which are not shown may be necessary to provide power to some of the blocks.

Other alterations and variations will be obvious to those skilled in the art. I do not wish to be limited to the specification or the particular embodiment shown in the figures but only by the following claims in which I intend to cover all modifications which do not depart from the spirit or the scope of this invention.

I claim:
1. In combination:
   first means having an input means and including means for electronically providing first differential outputs in the form of a pair of pulse trains each having a repetition frequency indicative of a signal applied to said input means and second differential outputs in the form of a pair of signals each indicative in amplitude of the repetition frequency of said first output;
   second means for responding to a change in a condition, said second means including input means, output means, and rebalance input means;
   first connection means for applying a signal indicative of an output of said second means to said input means of said first means; and
   second connection means for applying a signal indicative of the difference in amplitudes of said pair of signals appearing at second output of said first means to said rebalance input means of said second means.
2. The apparatus of claim 1 wherein said first means comprises a voltage controlled, electronic oscillator providing the first outputs and the second outputs.

References Cited

UNITED STATES PATENTS

| | | | |
|---|---|---|---|
| 2,697,594 | 12/1954 | Stanton | 73—517 |
| 3,237,456 | 3/1966 | Shaw | 73—517 |
| 3,151,487 | 10/1964 | Schuck | 73—517 |
| 3,318,158 | 5/1967 | Bromander et al. | 73—517 |
| 3,386,292 | 6/1968 | Watson et al. | 73—517 |
| 3,329,027 | 7/1967 | Davidson | 73—517 |
| 2,968,950 | 1/1961 | Dunbar | 73—517 |

JAMES J. GILL, Primary Examiner

HERBERT GOLDSTEIN, Assistant Examiner